Dec. 22, 1936.  B. LEVY  2,065,382
BRAKE
Filed April 8, 1935
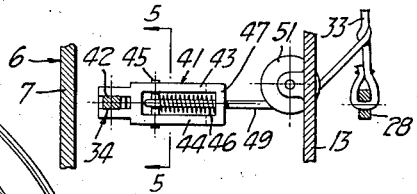
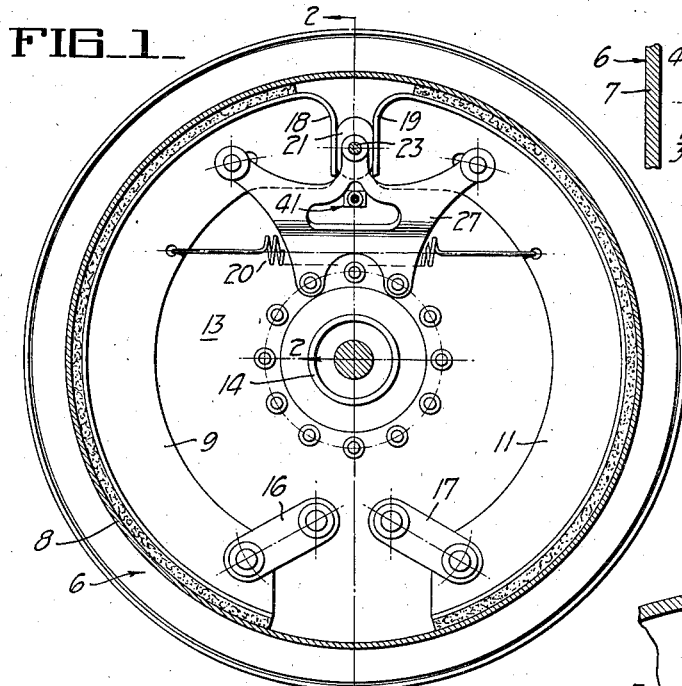
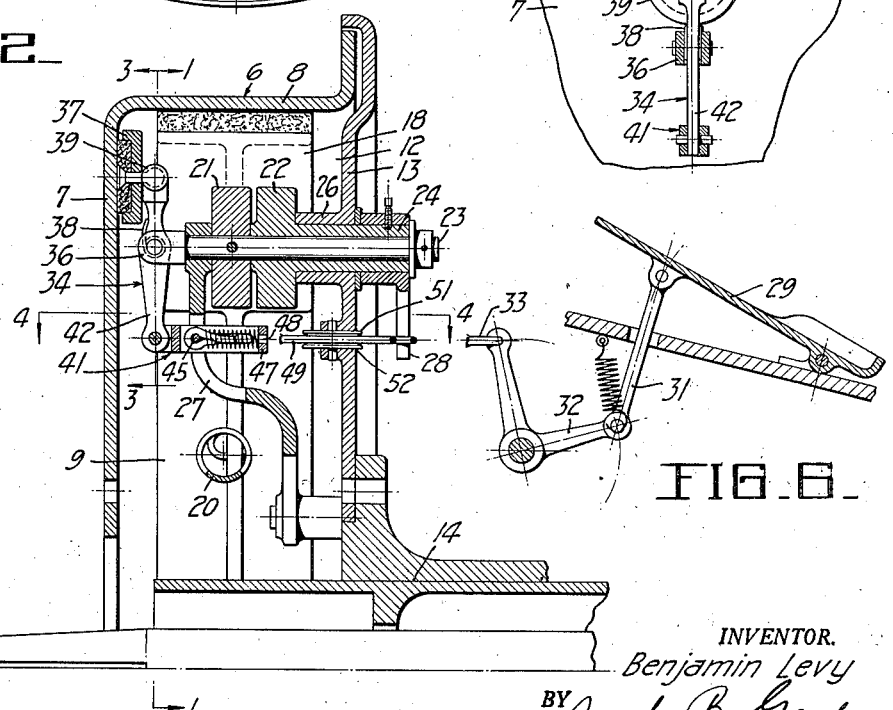
INVENTOR.
Benjamin Levy
BY Joseph B. Gardner
his ATTORNEY Patented Dec. 22, 1936

2,065,382

UNITED STATES PATENT OFFICE 2,065,382

BRAKE

Benjamin Levy, Oakland, Calif.

Application April 8, 1935, Serial No. 15,178

9 Claims. (Cl. 188—140)

The invention relates to brakes such as adapted for automotive vehicles and more particularly to brakes of a self energizing type wherein power is taken from the rotating wheel and used for actuating the brake.

As will be understood, in slowing down or stopping a moving automobile a considerable change in energy takes place which is used in part in the case of brakes of the present type for applying a braking force to the vehicle. In accordance with the present invention, and as a principal object thereof, I have provided an improved means for transmitting a portion of the power available to the brake which will so modify and cushion the force used to set the means in operation that the brake will be applied gradually and uniformly and substantially all tendency for the brake to lock even when operated abruptly and suddenly will be substantially entirely avoided.

Another object of the invention is to provide a brake of the character described which will be operated by a combination of a manual and power control, each operating through separate mechanisms to set the brake independently of the other, whereby a positive operation of the brake is at all times assured.

A further object of the invention is to provide a brake of the above character having a generally simplified construction productive of a positive and smooth operation of the device with but a minimum number of operating parts and thereby substantially eliminating the possibility of the device failing to operate properly under substantially all conditions of use.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a vertical sectional view of a brake embodying the features of my invention and is taken substantially on the plane of the line 1—1 of Figure 2.

Figure 2 is a sectional view of the brake shown in Figure 1 and is taken substantially on the plane of the line 2—2 of Figure 1.

Figures 3 and 4 are fragmentary sectional views of the brake and are taken substantially on the planes of the lines 3—3 and 4—4 of Figure 2.

Figure 5 is a fragmentary transverse sectional view of the part shown in Figure 4 and is taken substantially on the plane of line 5—5 of Figure 4.

Figure 6 is a sectional view showing a foot treadle for operating the brake.

Referring to the drawing, the means of my invention is arranged for use in connection with the standard type of automobile brake including a brake drum 6 having a radial side 7 arranged to be fixed to for rotation with one of the wheels of the automobile and an annular or circumferential extending side 8 against which the brake shoes 9 and 11 are arranged to engage for resisting the movement of the wheel. The brake drum is further provided with an open side 12 which is positioned opposite a backing plate or support 13 which is fixedly secured to the axle housing 14 of the wheel support. The brake shoes 9 and 11 are also of more or less standard design, being here shown secured at their lower ends to the backing plate as by links 16 and 17 and extending around the opposite inner sides of the drum wall 8 and with their upper ends 18 and 19 extending into opposed spaced relation for engagement with the spreading means of my invention. Also, as is more or less common in this type of brake construction, an expansion spring 20 is connected between the brake shoes 9 and 11 for resisting the outward expansion thereof into engagement with the drum, and for normally retaining the brake shoes in an inoperative position spaced from the drum.

In the present invention, and as previously indicated as one of the principal features thereof, I provide for a dual brake control means, one of which is arranged for manual operation and the other for automatic operation. In carrying out this feature, I prefer to use a pair of cam members 21 and 22 which are mounted between the ends 18 and 19 of the brake drum and may rotate one independently of the other for displacing the brake shoes into engagement with the drum. As here shown, the cams 21 and 22 are supported on telescopically arranged shaft and sleeve 23 and 24 respectively, the latter being mounted in a bearing flange 26 formed on the backing plate 13 and rotatably carrying the sleeve 24 and a bracket 27 also secured to the backing plate and extending inwardly therefrom to provide a supporting bearing for the shaft 23.

An arm 28 is fixed to the sleeve 24 at the outer side of the plate 13 for operating the cam 22 and is in turn arranged for manual operation by means including a foot treadle 29 arranged for positioning in the operator's compartment of the automobile and connected by a link 31 to a bell crank 32 which is in turn connected by means of a cable 33 with the arm 28. Thus, on depression of the treadle 29, the cam 22 may be manually operated to actuate the brake.

Means for operating the cam 21 here include a lever 34 pivoted intermediate its length along a transverse axis to the inner end 36 of the shaft 23 and which carries at its upper end an auxiliary brake shoe 37 adapted for engagement with the radial side 7 of the brake drum. On advancement of the brake shoe 37 into engagement with the drum when the latter is rotating, a frictional drag is established between the shoe and drum which when transmitted through the lever 34 will apply an operating torque to the shaft 23 for rotating the cam 21. The spring 38 here shown mounted at the pivotal connection of the lever 34 and inner shaft end 36, normally serves to hold the shoe 37 spaced from the drum and to return the shoe to a spaced inoperative position at the termination of the braking operation. Preferably in order that the shoe 37 may properly position itself against the side wall 7 of the drum incident to a rotative advancement thereto, the shoe and upper lever end may be connected through means of a ball and socket joint 39 or other universal connection.

In accordance with the present invention, the auxiliary brake shoe 37 is arranged to be brought into engagement with the brake drum by means under manual control, while, as will be understood, the braking torque provided by the auxiliary shoe when set into operation manually is a function of the available kinetic energy of the rotating brake drum rather than the energy manually applied. The means for so moving the auxiliary shoe 37 into engagement with the drum here includes an open rectangular frame member 41 which is pivoted to the lower end 42 of the lever 34 and is provided with slotted sides 43 and 44 for reciprocally carrying over its length a cross pin 45. A helical compression spring 46 is mounted in the frame between the outer end 47 of the frame and the cross pin 45 for urging the pin to adjacent the end of the frame engaged at the lower end 42 of the lever. Mounted through an opening 48 in the end 47 and extending centrally through the spring 46 and into engagement with the cross pin 45 is a cable 49 which extends from the member 41 and over a sheave 51 rotatably mounted in an opening 52 in the backing plate 13 to connect with the operating cable 33. It will thus be understood that on drawing of the cable 49 the initial stress is taken up by the spring 46 and gradually and uniformly applied thereby through the frame member 41 and lever 34 to the auxiliary brake shoe 37. This latter feature is of utmost importance since it positively prevents the sudden pressing of the shoe 37 against the drum and a likely locking of the brake incident to a sudden and abrupt actuation of the treadle 29.

It will now be clear that since the actuating cable 33 connects with both the arm 28 and with the cable 49 the operation of both of the cams 21 and 22 is under the control of the foot treadle 29. As will also be understood, the operating means provides for the actuation of the cams 21 and 22 independently of each other as occasioned by the direct and positive rotation of the cam 22 when the automobile is not in the course of movement, when as a result no displacement of the cam 21 will be effected.

Preferably, the cam 21 is, as shown in Figure 1, arranged symmetrically to either side of a vertical axis so that the cam will be equally effective in expanding the brake shoes upon rotation thereof in opposite directions. With such an arrangement, it will be understood that the auxiliary self-powered brake unit will function similarly for either an advance or reversed movement of the vehicle.

I claim:

1. In a brake of the character described the combination of a rotatable brake drum, a brake shoe, a member movable to engage said shoe and drum, manually operated means for so moving said member, a second member movable to engage said shoe and drum, and means arranged for receiving power from the brake drum on rotation thereof for urging the aforesaid movement of said second member and including a member movable into engagement with said drum and connected to said second member, and means for so moving said last named member and connected to said first means for simultaneous operation therewith.

2. A brake mechanism comprising in combination, a wheel having a brake drum mounted for rotation therewith, a brake shoe, a displaceable cam for moving said shoe into engagement with said drum, manually controlled means for displacing said cam, a second cam displaceable to move said shoe into engagement with said drum, means engageable with said drum for receiving power therefrom on rotation of the drum and connected to said second cam for displacement thereof, and means for engaging said second means and drum and connected to said first means for simultaneous operation therewith and including a spring for cushioning the force applied to said second means.

3. A brake mechanism comprising in combination, a rotatable brake drum, a stationary support mounted adjacent said drum, a brake shoe, a shaft rotatably carried by said support, means on said shaft arranged on rotation thereof to displace said shoe into engagement with said drum, a lever pivoted intermediate its length about a transverse axis to said shaft, a brake shoe carried by one end of said lever and advanceable into engagement with said drum to serve on rotation of the drum to apply rotating torque to said shaft, and means connecting said lever for advancing said second named shoe into engagement with said drum.

4. A brake mechanism comprising in combination, a rotatable brake drum having an open side, a stationary support mounted adjacent said side, a brake shoe in said drum, a shaft rotatably carried by said support and extending into said drum, a cam on said shaft arranged on rotation to displace said shoe into engagement with said drum, a lever pivoted intermediate its length about a transverse axis to said shaft in said drum, a brake shoe carried by one end of said lever and advanceable into engagement with said drum to serve on rotation of the drum to apply rotating torque to said shaft and cam, and manually controlled means connecting said lever for advancing said second named shoe into engagement with said drum.

5. A brake mechanism comprising in combination, a rotatable brake drum, a stationary support mounted adjacent said drum, a brake shoe, a shaft rotatably carried by said support, means on said shaft arranged on rotation thereof to displace said shoe into engagement with said drum, a lever pivoted intermediate its length about a transverse axis to said shaft, a brake shoe universally mounted on one end of said lever and advanceable into engagement with said drum to serve on rotation of the drum to apply rotating torque to said shaft, and means connecting said lever for advancing said second named shoe into engagement with said drum.

6. A brake mechanism comprising in combination, a rotatable brake drum having an open side, a stationary support mounted adjacent said side, a brake shoe in said drum, a shaft rotatably carried by said support and extending into said drum, a cam on said shaft arranged on rotation to displace said shoe into engagement with said drum, a lever pivoted intermediate its length about a transverse axis to said shaft in said drum, a brake shoe universally mounted on one end of said lever and advanceable into engagement with said drum to serve on rotation of the drum to apply rotating torque to said shaft and cam, and manually controlled means connecting said lever for advancing said second named shoe into engagement with said drum.

7. A brake mechanism comprising in combination, a rotatable brake drum having an open side, a stationary support mounted adjacent said side, a brake shoe in said drum, telescoping members carried by said support and extending into said drum, cams on said members arranged on rotation to displace said shoe into engagement with said drum, an actuating arm on one of said members at the outer side of said support, a lever pivoted intermediate its length about a transverse axis to the other of said members in said drum, a brake shoe carried by one end of said lever and advanceable into engagement with said drum to serve on rotation of the drum to apply rotating torque to said last named member, a spring mounted between said lever and shaft for normally holding said last named shoe spaced from said drum, a spring secured to the other end of said lever, a cable secured to said spring and arranged to transmit an actuating force through said spring to said lever for engaging said second shoe and drum and connected to said arm for rotating same.

8. A brake mechanism comprising in combination, a rotatable brake drum having radial and annular walls and an open side, a plate mounted adjacent said side, a brake shoe in said drum, a sleeve rotatably carried by said plate and extending into said drum, a cam on said sleeve arranged on rotation of the latter to displace said shoe into engagement with said annular drum walls, a shaft rotatably carried in said sleeve and extending into said drum, a second cam on said shaft arranged on rotation of the latter to displace said shoe into engagement with said annular drum walls independent of said first cam, a lever pivoted intermediate its length about a transverse axis to said shaft in said drum, a brake shoe carried by one end of said lever and advanceable into engagement with said radial drum wall to serve on rotation of the drum to apply rotating torque to said shaft, a spring mounted between said lever and shaft for normally holding said last named shoe spaced from said drum, an open frame member pivoted to the other end of said lever with the sides thereof provided with opposed guides, a pin mounted for movement in said guides, a spring carried by said member and urging said pin to a position adjacent one end of the guides, a cable secured to said pin and arranged to transmit an actuating force through said spring to said lever for engaging said second shoe and drum, a sheave carried by said plate for supporting said cable, an arm on said sleeve at the outer side of said plate, and an actuating cable connected to said arm and first cable.

9. In a brake of the character described the combination of a rotatable brake drum, a brake shoe movable to engage said drum, manually operable means for so moving said shoe, and means arranged for receiving power from the brake drum on rotation thereof for moving said shoe into engagement with said drum and connected to said manually operable means and set into operation thereby on movement of said manual means to engage said shoe and drum, whereby the operation of said brake will be jointly and simultaneously controlled by said manual means and said second named power means.

BENJAMIN LEVY.